United States Patent
Delcamp et al.

(10) Patent No.: US 12,338,181 B2
(45) Date of Patent: Jun. 24, 2025

(54) METHOD FOR TREATING A SILICON CARBIDE FIBRE

(71) Applicants: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR); INSTITUT POLYTECHNIQUE DE BORDEAUX, Talence (FR)

(72) Inventors: Adrien Delcamp, Moissy-Cramayel (FR); Marie Lefebvre, Moissy-Cramayel (FR); Cyril Aymonier, Begles (FR); Nicolas Biscay, Bordeaux (FR)

(73) Assignees: CENTRE NATIONAL DE LA RECHERCHE SCIENTIFIQUE, Paris (FR); UNIVERSITE DE BORDEAUX, Bordeaux (FR); INSTITUT POLYTECHNIQUE DE BORDEAUX, Talence (FR)

( * ) Notice: Subject to any disclaimer, the term of this patent is extended or adjusted under 35 U.S.C. 154(b) by 70 days.

(21) Appl. No.: 18/571,551

(22) PCT Filed: Jun. 20, 2022

(86) PCT No.: PCT/FR2022/051187
§ 371 (c)(1),
(2) Date: Dec. 18, 2023

(87) PCT Pub. No.: WO2022/269178
PCT Pub. Date: Dec. 29, 2022

(65) Prior Publication Data
US 2024/0279124 A1  Aug. 22, 2024

(30) Foreign Application Priority Data
Jun. 23, 2021 (FR) ..................... 2106670

(51) Int. Cl.
*C04B 35/80* (2006.01)
*C04B 35/628* (2006.01)
(Continued)

(52) U.S. Cl.
CPC ........ *C04B 35/80* (2013.01); *C04B 35/62836* (2013.01); *C04B 41/0072* (2013.01); *C04B 41/5353* (2013.01); *C04B 2235/5244* (2013.01)

(58) Field of Classification Search
CPC .............. C04B 35/80; C04B 35/62836; C04B 41/5353
See application file for complete search history.

(56) References Cited

U.S. PATENT DOCUMENTS

| 2006/0147692 A1* | 7/2006 | Kmetz | .............. C04B 35/62868 428/292.1 |
| 2018/0194686 A1 | 7/2018 | Loison et al. | |

FOREIGN PATENT DOCUMENTS

JP   2004-277213 A   10/2004

OTHER PUBLICATIONS

International Search Report as issued in International Patent Application No. PCT/FR2022/051187, dated Oct. 17, 2022.

* cited by examiner

*Primary Examiner* — Robert A Vetere
(74) *Attorney, Agent, or Firm* — Pillsbury Winthrop Shaw Pittman LLP

(57) ABSTRACT

A method for treating at least one silicon carbide fibre includes a surface layer including carbon and/or a silicon oxycarbide, the treatment including at least removing the surface layer from the fibre by placing in contact with an ammonia phase in the supercritical state.

8 Claims, 3 Drawing Sheets

(51) Int. Cl.
*C04B 41/00* (2006.01)
*C04B 41/53* (2006.01)

[Fig. 1]
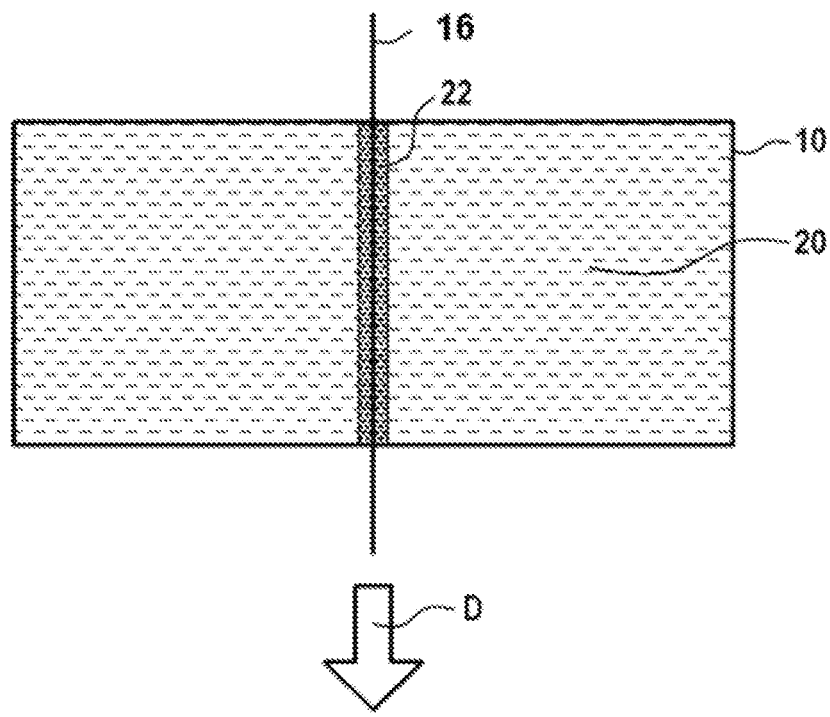
[Fig. 2]
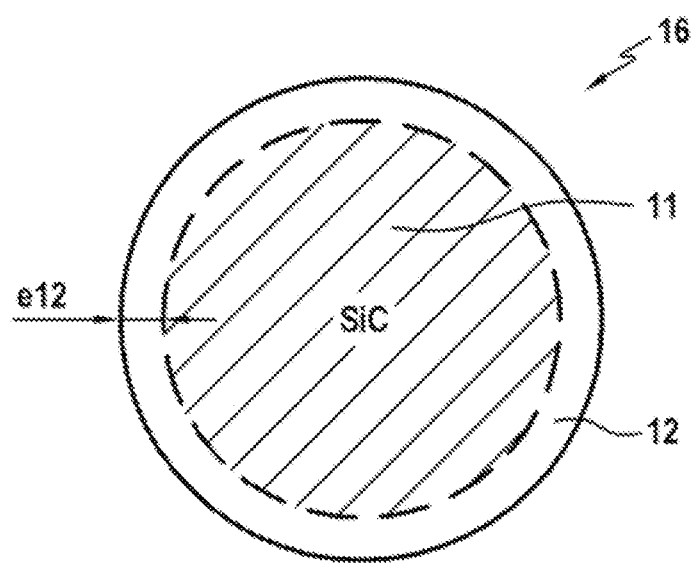

[Fig. 3]
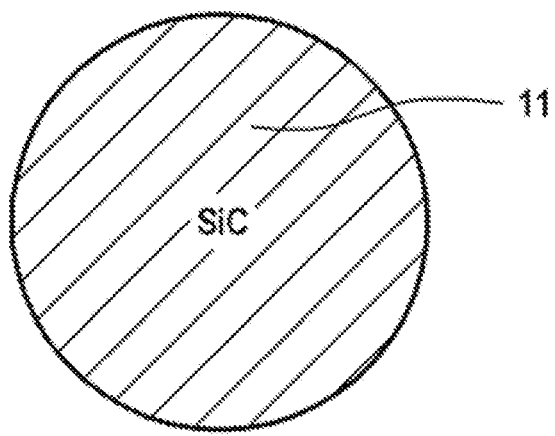
[Fig. 4]
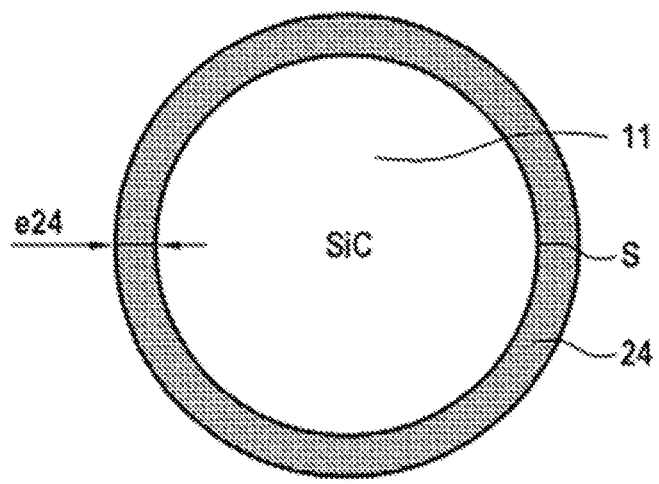

[Fig. 5]
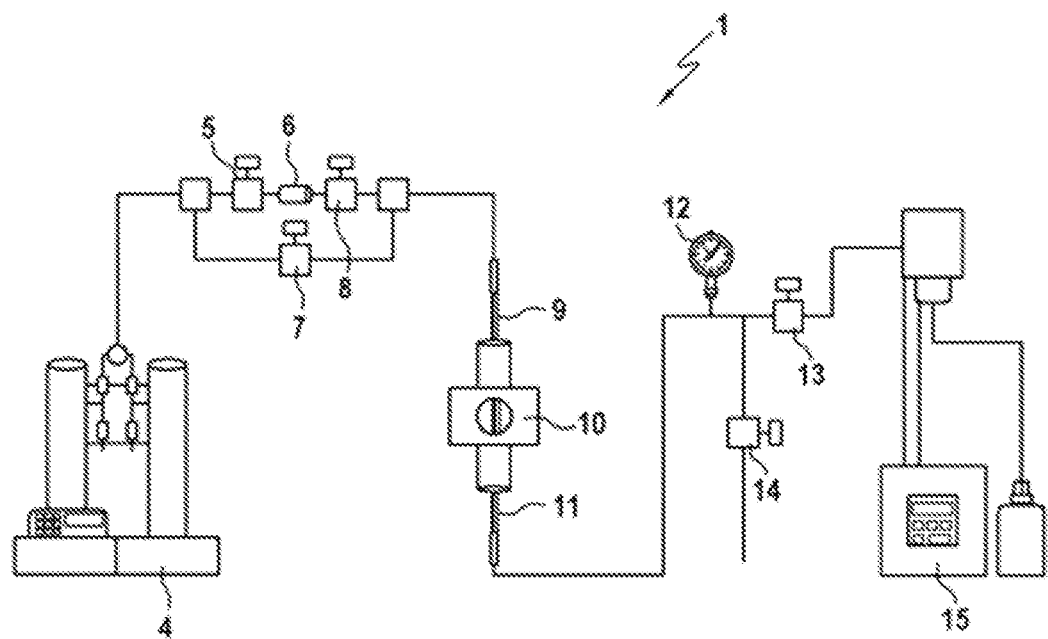

METHOD FOR TREATING A SILICON CARBIDE FIBRE

CROSS-REFERENCE TO RELATED APPLICATIONS

This application is the U.S. National Stage of PCT/FR2022/051187, filed Jun. 20, 2022, which in turn claims priority to French patent application number 2106670 filed Jun. 23, 2021. The content of these applications are incorporated herein by reference in their entireties.

TECHNICAL FIELD

The present invention relates to a method for treating at least one silicon carbide fibre having a surface layer to be removed before forming a coating on the surface of the fibre.

PRIOR ART

Ceramic matrix composite materials ("CMC materials") have good mechanical properties, making them suitable for forming structural elements and advantageously keeping these properties at high temperatures. They are an interesting alternative to commonly used metal parts, because they allow lightening of the structure.

A CMC material can be produced by forming a fibrous preform, the shape of which is similar to that of the final part, which is then densified by a ceramic matrix. The function of a CMC material requires specific management of the interfacial bonds between fibres and matrix, in order to obtain the hard-to-damage nature of the final composite. This modulation of the interfaces is conventionally obtained by positioning an interphase between the fibre and the matrix. In the context of thermostructural applications, the use of boron nitride for the interphase may be favoured in comparison with pyrolytic carbon (PyC), because of its more advantageous oxidation behaviour.

It is known that, before the interphase deposition step, a surface treatment of the fibres, intended to remove the heterogeneities present at the surface, significantly improves the properties of the final composite material. Document US 2018194686A1 is known, in particular. This document discloses a method for stripping the surface of SiC fibres, of the "Hi-Nicalon S" type, before forming an interphase. In this method, the surface of the fibres is first oxidised in order to form a surface layer of silica, then treated by an acid liquid medium comprising at least hydrofluoric acid (HF), in order to remove the layer of silica formed. After this treatment, stripped fibres are obtained having a homogeneous silicon carbide surface giving an improved bonding of the treated fibre with the deposited interphase. This solution provides satisfactory results. However, the environmental compatibility of this method, using HF acid, could be improved. In addition, this method requires carrying out various fibre manipulation steps: rinsing and drying of the treated fibres, or movements of the fibres from one chamber to another. It would be desirable to have a treatment that was simpler and quicker to carry out.

DISCLOSURE OF THE INVENTION

The invention relates to a method for treating at least one silicon carbide fibre comprising a surface layer containing carbon and/or a silicon oxycarbide, wherein the treatment comprises at least removing the surface layer from the fibre by placing in contact with an ammonia phase at a temperature greater than or equal to 100° C. and at a pressure greater than or equal to 1 bar.

To the knowledge of the inventors, the use of such an ammonia phase in order to remove the surface layer comprising surface heterogeneities is not known or suggested in the literature. This solution provides good results for removing the surface layer of the fibre, which is responsible for a low adhesion of a coating formed thereon, while avoiding the use of toxic compounds. The ammonia phase can be in the gaseous, liquid or supercritical state.

The use of a supercritical ammonia phase has advantages. The kinetics of removal of carbon species present at the surface of the fibres is clearly greater under supercritical conditions, due to the fact of combining the application of a high temperature and a high ammonia concentration, this combination favouring the reaction. In techniques using a gaseous phase or a liquid phase, only one of these effects is employed: the high temperature but with a low concentration of ammonia in the case of the gaseous treatment, or the high concentration but with a low temperature during the use of a liquid phase, which gives lower treatment speeds. In addition, the use of supercritical ammonia will remove surface carbon and other oxide contaminants if they are present, which will no longer adhere and will be removed. In comparison with the use of gaseous ammonia, the use of supercritical ammonia has the advantage of recycling, returning to its initial state after the treatment and thus enabling the recovery of ammonia which can then be reused, whereas high temperature gaseous ammonia is cracked into by-products which are not reusable. Moreover, these by-products (such as HCN) need to be neutralised in the effluents, which treatment can be avoided when supercritical ammonia is used. Thus, treatment in the supercritical phase enables a more efficient and simpler treatment of the silicon carbide fibre.

In an embodiment, the removal of the surface layer is carried out in a treatment chamber, and the treatment further comprises, after this removal, the formation of a coating on said at least one fibre, in the treatment chamber, from a treatment medium comprising at least ammonia.

This feature advantageously makes it possible to carry out the steps of removing heterogeneities and performing the coating in the same chamber, which makes it possible to avoid a return to ambient air of the fibre and reduces the manipulations. It also makes it possible to avoid any risk of functionalisation of the end surface of the fibres and to obtain even better adhesion of the coating to the fibres. In addition, ammonia is used in both cases, removing any problem of chemical compatibility between the two steps.

In an exemplary embodiment, the temperature of the ammonia phase can be greater than or equal to 600° ° C., for example between 600° C. and 1600° C. The use of such a temperature is advantageous because it further activates the reaction between carbon and ammonia, and therefore increases the kinetics of the treatment.

In particular, the temperature of the ammonia phase is between 800° C. and 1200° C., and the pressure of the ammonia phase can be between 100 bar and 150 bar. In general, the pressure of the ammonia phase can be greater than the critical pressure.

Such a feature can make the treatment compatible with an industrial scale implementation.

In an exemplary embodiment, said at least one fibre is heated by microwaves during the treatment.

The microwave field can take the surface of the treated fibre to a sufficiently high temperature so as to locally reach the desired conditions. The microwave field can heat the entire fibre in order to ensure a homogeneous treatment. In addition, the energy necessary for treating the fibre is reduced, because the fibre is heated directly rather than the entire treatment chamber. Nevertheless, it does not go beyond the scope of the invention if another heating means is used, such as radiation from a susceptor.

In an exemplary embodiment, said at least one fibre moves through a treatment chamber during the treatment. The movement of the fibre in the treatment chamber can take place in the same direction or counter-current with respect to a circulation of the ammonia phase or the treatment medium.

The use of an ammonia phase as described above, which can accelerate the kinetics, is particularly advantageous for carrying out the continuous deposition on a fibre moving in the treatment chamber, and thus strongly improves the rate of treatment. In an exemplary embodiment, said at least one fibre is made of silicon carbide having an oxygen content less than or equal to 1% in atomic percent.

The invention also relates to a method for manufacturing a composite material part, comprising at least the formation of a matrix in the pores of a fibrous reinforcement, the fibres of the fibrous reinforcement having been treated by implementing a method such as that described above.

It will be noted that the fibrous reinforcement can be obtained after treatment of a plurality of fibres in the manner described above. Alternatively, the fibrous reinforcement can first be formed from a plurality of fibres, then this reinforcement is treated in the manner described above.

The composite material part can, for example, be a turbomachine part, for example a turbomachine blade or vane or a turbine ring segment.

BRIEF DESCRIPTION OF THE DRAWINGS

FIG. 1 schematically represents the treatment of a fibre in a treatment chamber in the context or an example of the method according to the invention.

FIG. 2 is a sectional view schematically representing the structure of a silicon carbide fibre, initially having a surface layer.

FIG. 3 is a sectional view schematically representing the structure of the silicon carbide fibre of FIG. 2 after removal of the surface layer and before depositing the coating.

FIG. 4 is a sectional view schematically representing the structure of the treated coated fibre.

FIG. 5 schematically represents an example of a treatment installation that can be used for implementing the method according to the invention.

DESCRIPTION OF THE EMBODIMENTS

FIG. 1 shows the treatment of a fibre 16 enabling its surface to be treated in order to remove the heterogeneities, with a view to then coating it in the same chamber with a coating, for example with a boron nitride interphase.

The treated fibre is made of silicon carbide, optionally having an oxygen content less than or equal to 1% in atomic percent. Such fibres include, for example, the fibres marketed under the name "Hi-Nicalon S" or "Hi-Nicalon". Alternatively, Si—C—O fibres can be treated, which have a higher oxygen content. Such fibres include, for example, the fibres marketed under the name "Nicalon".

FIG. 2 very schematically illustrates the cross-section of a silicon carbide fibre 16, before the pretreatment. The fibre 16 has a surface layer 12 comprising a silicon oxycarbide (composed of silicon, carbon and oxygen) and/or carbon, which it is preferable to remove before deposition of the coating. The surface layer 12 can be enriched with carbon compared with the stoichiometry of the silicon carbide. The surface layer 12 can be mainly formed of carbon, with an atomic proportion of carbon in the surface layer 12 greater than 50%, for example greater than or equal to 60%. The thickness e12 of the surface layer 12 can be generally between 1 nm and 1 mm, for example between 1 nm and 1 µm. The silicon carbide fibre 16 consists of a silicon carbide core 11 and a surface layer 12 located in the vicinity of the surface of the fibre 16. The surface layer 12 has a heterogeneous surface state. The surface layer 12 can be responsible for a reduction in the quality of the adhesion of the fibre to a coating covering it.

In the considered example, the fibre 16 moves through a treatment chamber 10 in the direction indicated by the arrow D in FIG. 1, during the treatment. The treatment of the fibre can be carried out continuously, without interrupting the movement of the fibre. Alternatively, it is possible to treat the fibre segment by segment, the segment to be treated being immobilised in the treatment chamber 10 and the surface layer of the fibre being removed, an adjacent fibre segment 16 then being introduced into the chamber 10 so as to remove the surface layer from this adjacent segment.

The treated fibre 16 is unwound from a reel (not shown), passes into the treatment chamber 10 and is then wound onto a reel after treatment. The speed of travel of the fibre 16 in the treatment chamber 10 can be between 0.1 cm/s and 50 cm/s. The treatment chamber 10 is filled with a fluid medium 20 comprising ammonia, for example substantially formed by ammonia. The fluid medium 20 can be in liquid form. The fluid medium 20 can be pressurised, for example at a pressure greater than or equal to the critical pressure of ammonia. The fibre 16 is immersed in the fluid medium 20 during its treatment in the treatment chamber 10. In the illustrated example, the fibre 16 is heated directly, for example by application of a microwave field. Heating enables the temperature to be increased, at least in the vicinity of the fibre 16, in order to obtain the ammonia phase 22 useful for the treatment.

The ammonia phase 22 performing the treatment has a temperature greater than or equal to 100° C. and a pressure greater than or equal to 1 bar. The surface layer 12 can be removed by placing fibre 16 in contact with the ammonia phase at a temperature between 600° C. and 1600° C. and a pressure between 1 bar and 300 bar. The temperature of the ammonia phase can be greater than or equal to 800° C. The pressure of the ammonia phase can be greater than or equal to 100 bar, for example between 100 bar and 150 bar. The fibre 16 can first be placed in contact with pressurised ammonia, at a pressure between 1 bar and 300 bar, then the heating of the fibre can be carried out so as to take the ammonia to the desired temperature and thus proceed to the removal of the surface layer 12. Ammonia may or may not be continuously injected into the chamber 10 during the treatment. In the case where there is a continuous circulation of the fluid medium during all or part of the treatment, it is possible to impose a ratio [flow of fluid medium introduced into the chamber]/[volume of the chamber] greater than or equal to 0.00016 $s^{-1}$, for example between 0.0016 $s^{-1}$ and 0.016 $s^{-1}$ or between 0.0016 $s^{-1}$ and 0.16 $s^{-1}$. The surface carbon of the fibre 16 can react with the ammonia so as to form hydrogen cyanide (HCN) which is removed. The oxycarbide compounds are also removed by the ammoniacal medium. Thus the fibre 11 is obtained with an improved surface state, for example free from heterogeneities, which is illustrated in FIG. 3, and which is intended to then be coated. The duration of the treatment for removing the surface layer 12 can be greater than or equal to 10 seconds, for example between 5 minutes and 30 minutes.

As indicated above, the method can be continued so as to coat the fibre 11 obtained, after removal of the surface layer 12, in the same chamber 10. In general, a coating can be formed on the fibre, in the treatment chamber 10, starting from a treatment medium comprising at least one precursor of the coating to be formed, dissolved in ammonia. The treatment medium can be in a gaseous, liquid or supercritical state. Ammonia can be the solvent for the precursor of the coating to be formed. It is thus possible, for example, to deposit a boron nitride interphase, from a fluid medium comprising ammonia borane (with chemical formula $BH_3NH_3$) dissolved in ammonia. The direct heating of the fibre by microwaves can induce the decomposition of ammonia borane on contact with the thus heated fibre, and form the boron nitride interphase. The interphase is formed by decomposition of ammonia borane under the effect of temperature. This decomposition can be used to obtain hexagonal boron nitride and releases molecular hydrogen. In particular, in the case where ammonia borane dissolved in ammonia is used, a temperature of the treatment medium can be greater than or equal to 600° C., for example between 600° C. and 1600° C., and a pressure of the treatment medium can be greater than or equal to 10 bar, for example between 10 bar and 300 bar. The temperature of the treatment medium can, in particular, be greater than or equal to 800° C., or greater than or equal to 900° C., for example between 800° C. and 1600° C., or between 900° C. and 1600° C., and the pressure of the treatment medium can be greater than or equal to 100 bar, for example between 100 bar and 150 bar. These conditions constitute a compromise making it possible to take advantage of the high solubility of ammonia borane while benefiting from improved mass transfer and thus higher deposition kinetics. Furthermore, these pressures are possible for an industrial development of the method.

The fluid medium comprising the precursor of the coating can move continuously through the treatment chamber 10, or alternatively the treatment chamber 10 can be initially filled with the fluid medium and the treatment can then be carried out without the fluid medium being introduced into the chamber or evacuated. In the case where there is a continuous circulation of the fluid medium comprising the precursor, during all or part of the treatment, it is possible to impose a ratio [flow of fluid medium introduced into the chamber]/[volume of the chamber] greater than or equal to $0.00016\ s^{-1}$, for example between $0.0016\ s^{-1}$ and $0.016\ s^{-1}$ or between $0.0016\ s^{-1}$ and $0.16\ s^{-1}$. For example, for a treatment chamber 10 having a volume between 0.1 mL and 100 mL, the fluid medium can be introduced into the chamber 10 during all or part of the treatment with a flow rate between 0.1 mL/minute and 10 mL/minute, for example between 0.1 mL/minute and 3 mL/minute. In general, the molar concentration of coating precursor in the fluid medium 20 can be greater than or equal to 0.001 mol/L, for example between 0.001 mol/L and 10 mol/L. The interphase 24 can have a thickness e24 greater than or equal to 1 nm, for example greater than or equal to 10 nm (see FIG. 4). This thickness e24 can be between 10 nm and 1 mm, for example between 10 nm and 10 μm. The interphase 24 obtained has a controlled and homogeneous thickness over the entire circumference of the treated fibre, with a stoichiometric ratio of boron:nitrogen close to unity. The boron nitride obtained can be crystalline. The use of a crystalline material is advantageous in order to increase the crack deflection properties. It is possible to obtain a hexagonal boron nitride interphase. The duration of the coating treatment of the fibre can be greater than or equal to 10 seconds, for example between 5 minutes and 30 minutes, or between 1 minute and 10 minutes.

The formation of a boron nitride interphase in the treatment chamber 10 from a medium comprising ammonia has just been described. Other types of coatings are possible, such as the deposition of a tantalum nitride (TaN) coating from a treatment medium comprising, for example, tris(diethylamino)(tert-butylimino)tantalum TBTDET dissolved in ammonia. According to this variant, the temperature of the treatment medium can be greater than or equal to 200° C., for example between 200° C. and 1600° C., and the pressure of the treatment medium can be greater than or equal to 10 bar, for example between 10 bar and 300 bar.

The advantage of this treatment is to carry out the steps of removing heterogeneities and performing the coating in the same chamber 10, which makes it possible to avoid a return to ambient air of the fibre and reducing the manipulations. In addition, ammonia is also used to form the coating, which removes any problem of chemical compatibility between the two steps.

Once the coating is deposited, the treatment chamber 10 can be cleaned by injecting pressurised liquid ammonia at a flow rate between 0.5 mL/minute and 10 mL/minute, in order to remove the excess precursor that has not reacted.

FIG. 5, which will be described in the following, illustrates, more completely, an example of an installation which can be used in order to implement a method according to the invention.

The installation 1 illustrated in FIG. 5 comprises a syringe pump 4, which can work at constant flow rate or pressure. It further comprises a device for generating microwaves able to heat the fibre 11 by means of this radiation, as well as a tube 9 made of material transparent to microwaves and containing the fibre 11 to be heated. The installation 1 comprises a pressure regulator 15 which can fix the pressure throughout the device when the syringe pump operates at constant flow rate.

In the case where the treatment of the fibre 11 is carried out so as to remove the boron nitride interphase, the tank 6 is initially filled with ammonia borane then connected to the remainder of the device. The syringe pump 4 is filled with the solvent and cooled by means of a cryostat. The syringe pump 4 is then opened, valves 7, 8, 13 and 14 being closed. The syringe pump functions at constant pressure and thus fills the reservoir 6 with ammonia at working pressure. The valve of the tank 5 is then closed and valve 7 opened, which places the entire device under pressure. Then, valve 13 is opened and the syringe pump is used in constant flow mode. The pressure is then fixed by means of the pressure regulator 15. Once the pressure in the system is stabilised, valve 7 is closed and the valve of the tank 5 and valve 8 are opened in order to inject the solution composed of ammonia borane and solvent into the treatment chamber 10. When the constant flow rate operation is stabilised, the microwave heating device is used to bring the fibre 11 contained in the chamber 10 to working temperature during a given time. When all of the precursor has been injected, pressurised solvent is injected (by means of the syringe pump) in order to remove any traces of precursor which may remain. A similar operating mode is used for the treatment by the ammonia phase, in order to remove the surface layer without using ammonia borane.

An example of a method according to the invention has just been described, in which one fibre is treated. However, it would of course not go beyond the scope of the invention if a plurality of fibres were treated simultaneously, so as to remove their surface layer and optionally then to form a coating on each of them. It will be noted that each fibre can be in the form of a roving comprising a plurality of filaments. It also does not go beyond the scope of the invention if it is no longer one fibre or a plurality of fibres that are not connected together that are treated, but an already formed texture comprising a plurality of fibres, that is mobile or immobile in the treatment chamber. Hence, the fibres can be treated in any form whatsoever, for example threads, rovings, strands, cables, fabrics, felts, mats and even two or three-dimensional textures. The fibres treated according to the method of the invention can advantageously be used to produce fibrous preforms of a composite material part. The conditions which have been described above for the treatment remain applicable whatever the form in which the fibre or fibres are treated.

The treatment of silicon carbide fibres has just been described, so as to remove their surface layer using an ammonia phase and then forming a coating on the surface of the fibre cleaned in this way. The following endeavours to describe the rest of the method for obtaining a composite material part from fibres thus treated.

Fibres obtained after treatment described above can then be used to form a fibrous preform of the part to be obtained. The formation of the fibrous preform uses textile operations which are known per se, for example weaving, optionally three-dimensional weaving. Thus, the preform can for example have an "interlock" weave, in other words a weave in which each layer of weft yarns links a plurality of layers of warp yarns, with all the yarns of the same weft column having the same movement in the weave plane. Other types of three-dimensional weaving can of course be used in order to produce the preform. As indicated above, it does not go beyond the scope of the invention if the preform is first formed from fibres, then the fibres of the preform thus obtained are treated as described above.

The method can proceed by the formation of at least one matrix phase in the pores of the fibrous preform, the fibres of which have been treated as described above.

The matrix obtained can be at least partially made of ceramic, for example mainly made of ceramic, for example entirely made of ceramic. The formation of the matrix uses techniques which are known per se, being for example carried out by a liquid densification (impregnation by a precursor resin of the matrix and transformation by cross-linking and pyrolysis, the process being repeatable) or a gaseous technique (chemical vapour infiltration of the matrix), or even by melt infiltration (MI).

The invention applies, in particular, to the production of parts made of ceramic matrix composite material formed by a fibrous reinforcement with silicon carbide fibres densified by a ceramic matrix, in particular refractory carbide, nitride or oxide.

Typical examples of such CMC materials are SiC—SiC materials (reinforcement made of silicon carbide fibres and matrix made of silicon carbide).

The part obtained can be an aeronautical or industrial turbomachine part. This part can be a turbomachine blade or vane or a turbine ring segment, for example.

Example

A fibre was passed through a treatment chamber 10, shown schematically in FIG. 1, which had a volume of 1 cm$^3$. The treated fibre was a silicon carbide fibre having an oxygen content less than or equal to 1% in atomic percent, corresponding to a fibre marketed under the name "Hi-Nicalon S". The fibre had, on its surface before treatment, a surface layer 12 having a thickness of approximately 100 nm.

A pretreatment step of the fibre was carried out first, by subjecting it in the chamber 10 to a supercritical ammonia phase. During the pretreatment, the fibre was heated by a microwave field enabling the temperature to be taken to 1000° C. and the supercritical ammonia phase was taken to a pressure of 120 bar. Ammonia was injected continuously into the treatment chamber during the pretreatment with a flow rate of 6 mL/min and the fibre was moved at a speed of 30 cm/minute. A surface stripped of silicon carbide was thus obtained, as shown in FIG. 3.

The boron nitride interphase was then deposited on the thus stripped fibre, in the same treatment chamber. During this deposition, the fibre moved in the treatment chamber at a speed of 30 cm/minute. A mixture of ammonia and ammonia borane, present at a molar concentration of 1 mol/L in the mixture, was introduced continuously into the treatment chamber with a flow rate of 1 ml/min. During the treatment, the surface of the fibre was taken to a temperature of 1100° C. by the microwave field and the fluid medium was at a pressure of 120 bar. The treatment was carried out during a period of 15 minutes and a BN interphase of 1000 nm was obtained in this way on the surface of the silicon carbide fibre.

The expression "between . . . and . . . " should be understood as including the limits.

The invention claimed is:

1. A method for treating at least one silicon carbide fibre comprising a surface layer containing carbon and/or a silicon oxycarbide, the method comprising at least removing the surface layer from the fibre by placing it in contact with an ammonia phase in the supercritical state.

2. The method according to claim 1, wherein the removal of the surface layer is carried out in a treatment chamber, and wherein the method further comprises, after the removal, forming a coating on said at least one fibre, in the treatment chamber, from a treatment medium comprising at least ammonia.

3. The method according to claim 1, wherein a temperature of the ammonia phase is greater than or equal to 600° C.

4. The method according to claim 3, wherein the temperature of the ammonia phase is between 800° C. and 1200° C., and a pressure of the ammonia phase is between 100 bar and 150 bar.

5. The method according to claim 1, wherein said at least one fibre is heated by microwaves during the treatment.

6. The method according to claim 1, wherein said at least one fibre-moves through a treatment chamber during the treatment.

7. The method according to claim 1, wherein said at least one fibre is made of silicon carbide having an oxygen content less than or equal to 1% in atomic percent.

8. A method for manufacturing a composite material part, comprising:
   treating fibers of a fibrous reinforcement by implementing a method according to claim 1, and forming a matrix in the pores of the fibrous reinforcement.

* * * * *

UNITED STATES PATENT AND TRADEMARK OFFICE
CERTIFICATE OF CORRECTION

| | | |
|---|---|---|
| PATENT NO. | : 12,338,181 B2 | Page 1 of 1 |
| APPLICATION NO. | : 18/571551 | |
| DATED | : June 24, 2025 | |
| INVENTOR(S) | : Adrien Delcamp et al. | |

It is certified that error appears in the above-identified patent and that said Letters Patent is hereby corrected as shown below:

On the Title Page

Item (73) SAFRAN CERAMICS, Le Haillan (FR) is missing.

Signed and Sealed this
Twenty-ninth Day of July, 2025

Coke Morgan Stewart
*Acting Director of the United States Patent and Trademark Office*